(12) United States Patent
Lee (10) Patent No.: US 11,388,000 B2
(45) Date of Patent: Jul. 12, 2022

(54) SYSTEMS AND METHODS TO FACILITATE DATA SECURITY IN A PORTABLE STORAGE DEVICE

(71) Applicant: IO TECHNOLOGIES, INC., Boca Raton, FL (US)

(72) Inventor: David Tak-Wai Lee, College Station, TX (US)

(73) Assignee: INNOTEK, INC., Boca Raton, FL (US)

( * ) Notice: Subject to any disclaimer, the term of this patent is extended or adjusted under 35 U.S.C. 154(b) by 213 days.

(21) Appl. No.: 16/903,175

(22) Filed: Jun. 16, 2020

(65) Prior Publication Data

US 2020/0403792 A1 Dec. 24, 2020

Related U.S. Application Data (60) Provisional application No. 62/863,615, filed on Jun. 19, 2019.

(51) Int. Cl.
| | |
|---|---|
| *H04W 12/08* | (2021.01) |
| *H04L 9/08* | (2006.01) |
| *H04L 9/40* | (2022.01) |
| *H04W 12/50* | (2021.01) |
| *H04W 12/63* | (2021.01) |
| *H04W 12/0471* | (2021.01) |
| *H04W 12/64* | (2021.01) |

(52) U.S. Cl.
CPC ........ *H04L 9/0897* (2013.01); *H04L 63/0492* (2013.01); *H04L 63/107* (2013.01); *H04W 12/0471* (2021.01); *H04W 12/50* (2021.01); *H04W 12/63* (2021.01); *H04W 12/64* (2021.01)

(58) Field of Classification Search
CPC combination set(s) only.
See application file for complete search history.

(56) References Cited

U.S. PATENT DOCUMENTS

| | | | |
|---|---|---|---|
| 8,909,944 B2 | 12/2014 | Matsushiba et al. | |
| 9,164,925 B2 | 10/2015 | Mo et al. | |
| 10,855,664 B1 * | 12/2020 | Ziraknejad | ............ H04W 4/021 |
| 11,140,157 B1 * | 10/2021 | Xia | ..................... H04L 63/0853 |
| 2007/0006290 A1 * | 1/2007 | Li | ........................... G06F 21/34 |
| | | | 726/9 |
| 2008/0113687 A1 * | 5/2008 | Prendergast | .......... H04W 12/06 |
| | | | 455/558 |

(Continued)

*Primary Examiner* — Cindy Trandai
(74) *Attorney, Agent, or Firm* — Womble Bond Dickinson (US) LLP (57) ABSTRACT

A portable storage device for connecting to a computer. The storage device includes a digital memory storage, a digital lock mechanism coupled to the digital memory storage, a wireless communication system coupled to the digital lock mechanism and a communication interface coupled to the digital lock mechanism. The communication interface is for connecting the portable storage device to the computer. The digital lock mechanism operates to prevent data in the digital memory storage from being transferred over the communication interface to the computer unless the digital lock mechanism is unlocked using the wireless communication system. A method for connecting and the portable storage device to a computer and then unlocking the portable storage device using the communication interface and the wireless communication system is also provided.

9 Claims, 7 Drawing Sheets

(56) References Cited

U.S. PATENT DOCUMENTS

| | | | | |
|---|---|---|---|---|
| 2009/0280862 | A1* | 11/2009 | Loughlin | E05B 37/08 340/5.55 |
| 2010/0031331 | A1* | 2/2010 | Ichinose | H04L 63/0853 713/151 |
| 2011/0113210 | A1* | 5/2011 | Klapman | G06F 3/0673 711/E12.001 |
| 2012/0011565 | A1* | 1/2012 | Garlie | G06F 21/6245 726/2 |
| 2013/0191626 | A1* | 7/2013 | Kuno | H04N 5/765 713/150 |
| 2013/0342314 | A1* | 12/2013 | Chen | G07C 9/00309 340/5.65 |
| 2015/0004937 | A1* | 1/2015 | Kremen | H04L 63/107 455/411 |
| 2015/0029041 | A1* | 1/2015 | Liu | G07F 17/24 340/932.2 |
| 2016/0028713 | A1* | 1/2016 | Chui | G06F 21/35 726/4 |
| 2016/0042579 | A1* | 2/2016 | Austen | B60R 25/245 340/5.61 |
| 2016/0112982 | A1* | 4/2016 | Babineau | H04W 64/00 455/456.1 |
| 2016/0142910 | A1* | 5/2016 | Lee | H04L 63/105 711/103 |
| 2016/0360417 | A1* | 12/2016 | Lee | G06F 12/14 |
| 2016/0368455 | A1* | 12/2016 | Kim | B60R 25/23 |
| 2017/0031334 | A1* | 2/2017 | Medelius | A61B 5/369 |
| 2018/0042061 | A1* | 2/2018 | Iinuma | H04W 76/10 |
| 2019/0355197 | A1* | 11/2019 | Mirpuri | H04W 4/80 |
| 2020/0036443 | A1* | 1/2020 | Wang | H04B 10/502 |
| 2020/0036569 | A1* | 1/2020 | Mekenkamp | H04W 12/041 |
| 2020/0051349 | A1* | 2/2020 | Campbell | G07C 9/22 |
| 2021/0136579 | A1* | 5/2021 | Gascuel | H04W 12/068 |

* cited by examiner

SYSTEMS AND METHODS TO FACILITATE DATA SECURITY IN A PORTABLE STORAGE DEVICE

FIELD OF THE INVENTION

The present invention relates generally to data processing. More specifically, the present invention relates to systems and methods to facilitate data security in a portable storage device.

BACKGROUND OF THE INVENTION

Portable storage devices like USB Flash Memory Drives or Portable Hard Disk Drives are convenient and popular tools for transferring and storing digital information. The portable storage device is a common necessity for many students and professionals to carry around digital information like documents, school assignments and programs. The portable storage devices are multi-gigabyte in memory size and inexpensive. Unfortunately, the risk of accidentally misplacing the portable storage devices is very high. This leads to unintended exposure of personal information, proprietary company information, as well as photos and videos stored on the portable device.

In general, consumers typically do not consider or take the necessary steps to ensure the security of digital information, even though privacy and security breaches have almost become common news regarding the portable storage device. As a result, many companies have completely banned the use of portable storage devices due to this risk for company related data.

Nowadays, manufacturers have two approaches to tackle this problem. The first method requires the usage of an encryption program that relies on the user's computer to encrypt the content. The approach is free of additional hardware and cost, but leads to the risk of incompatibility on the various platforms. Even on the same platform, the encryption process takes a significant amount of time. The second method is to add a dedicated encryption processor within the portable device. The companies with concerns and policies surrounding privacy and intellectual property now require employees to use the second method for eliminating security risk regarding digital data. The downside to the second method is the much higher cost of a portable storage device and slow speed of encryption.

Therefore, there is a need for improved methods and systems to facilitate data security in a portable storage device that may overcome one or more of the above-mentioned problems and/or limitations.

BRIEF SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

According to some embodiments, a system to facilitate data security in a portable storage device is disclosed. Accordingly, the portable storage device, in an instance, may be an electronic storage device configured to store digital data and provide security to the digital data using a digital lock mechanism. Further, the portable storage device, in an instance, may include components such as (but not limited to) a digital storage device, a digital lock mechanism, a communication interface, and a wireless communication system, etc.

According to some aspects, a method to facilitate data security in a portable storage device is disclosed. Accordingly, the method may include a step of receiving, using a communication device, a decryption key from at least one registered user device. Further, the method may include a step of authenticating, using a processing device, the decryption key for the portable storage device. Further, the method may include a step of decrypting, using the processing device, the digital content of the portable storage device based on the authenticating. Further, the method may include a step of accessing, using the processing device, the digital content of the portable storage device based on the decrypting.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTIONS OF THE INVENTION

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be a particular mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive.

Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of system and method to facilitate data security in a portable storage device, embodiments of the present disclosure are not limited to use only in this context.

Overview:

The present disclosure describes a portable storage device that may include a communication interface to an outside world such as a computer system, a storage element or a storage device, a wireless communication system including one or more wireless radio module, a digital lock/unlock mechanism that controls the availability of the content on the storage element and algorithms to control the lock/unlock of the digital content.

Further, the portable storage device typically may use a USB (Universal serial bus) as the communication interface to communicate with the outside world such as the computer or any outside device. Further, the portable digital storage device may also use any other established communication interface such as Firewire® or Apple Lightning®. A digital data storing component within the portable storage device, in an instance, may be a flash memory or a mechanical hard disk drive or a combination of both. The wireless communication system consisting of wireless radio module or modules may be any of, or a combination of protocols such as Bluetooth®, Wi-Fi, ZigBee® as well as any proprietary system.

Further, a digital lock mechanism that may protect the digital content, in an instance, may be a simple electronic switch that may turn on/off the storage element or an encryption processor that scrambles the contents of the storage element with an encryption/decryption key.

Further, the decryption key passes over wirelessly each time from the owner's side and may not be stored locally on the portable storage device. Further, a set of algorithms governs the lock/unlock system of the digital locking mechanism without user interaction or entering a password. Finally, a separate procedure to be applied for authenticating or pair ownership of the portable storage device with the owner as well as pairing recovery of the device.

Further in some embodiment, the present disclosure provides a portable digital storage device that has a built-in wireless communication system. The portable storage device contains a built-in lock/unlock mechanism for the digital content stored in the portable storage device. The wireless communication system in the portable digital storage device may facilitate the communication between the device and the user's wireless device.

Further, the portable digital storage device may also contain a set of algorithms that may provide the lock/unlock mechanism for the digital data including but not limited to the need of encrypting and decrypting the digital data. Further, the algorithm may also authenticate the pairing of the portable digital storage device with the user's wireless device. The pairing of the portable digital storage device with the user's wireless device, in an instance, may serve as the key for encrypting/decrypting the digital data on the portable digital storage device.

Further, in some embodiments, a key may be transmitted from a registered user device to encrypt and/or decrypt digital data stored in the portable storage device.

Figure 1:
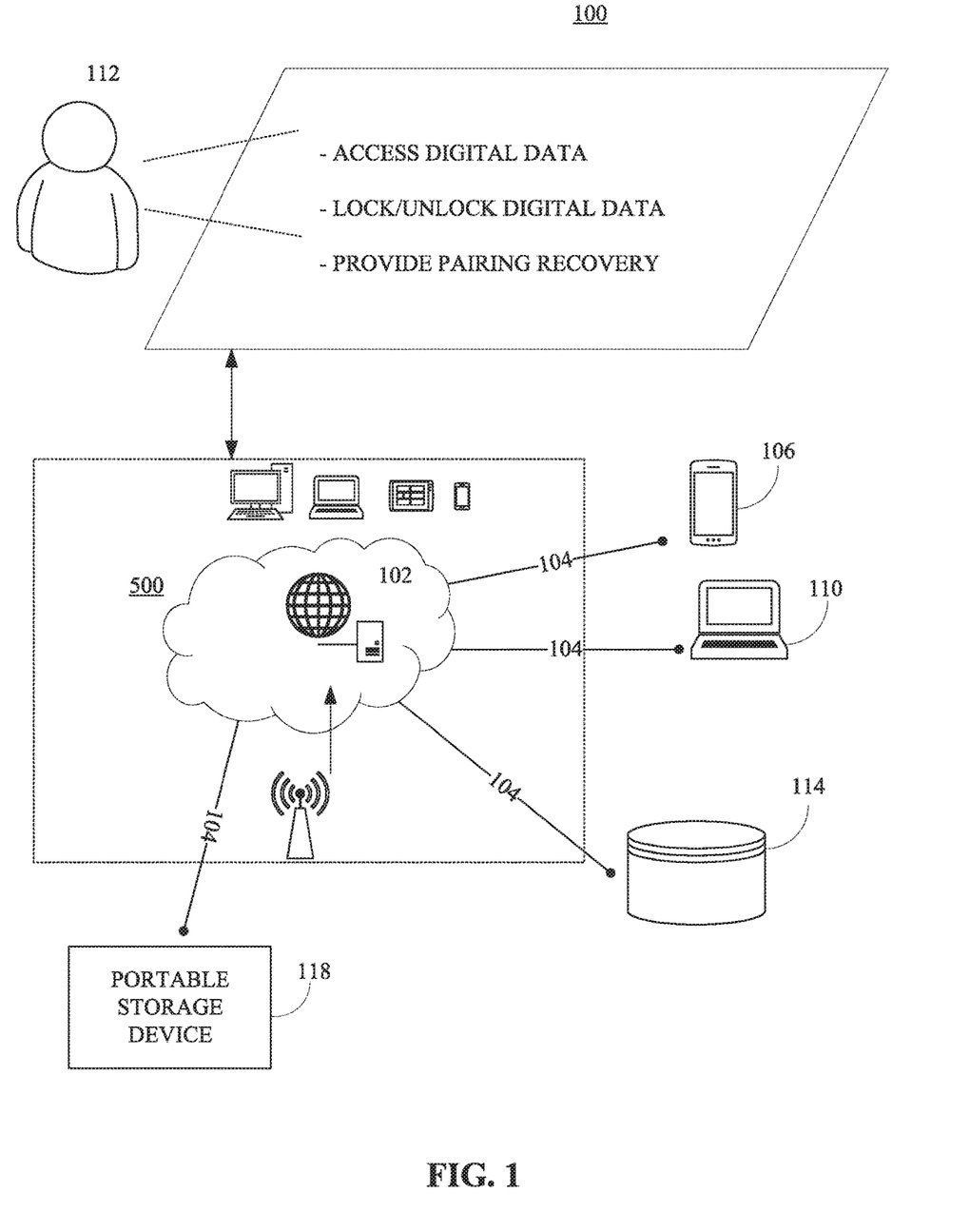
FIG. 1 is an illustration of an online platform consistent with various embodiments of the present disclosure.

FIG. 1 is an illustration of an online platform 100 consistent with various embodiments of the present disclosure. By way of non-limiting example, the online platform 100 to facilitate data security in a portable storage device may be hosted on a centralized server 102, such as, for example, a cloud computing service. The centralized server 102 may communicate with other network entities, such as, for example, a mobile device 106 (such as a smartphone, a laptop, a tablet computer etc.), other electronic devices 110 (such as desktop computers, server computers etc.), databases 114 and a portable storage device 118 over a communication network 104, such as, but not limited to, the Internet. Further, users of the online platform 100 may include relevant parties such as, but not limited to, end users, and administrators. Accordingly, in some instances, electronic devices operated by the one or more relevant parties may be in communication with the online platform 100.

A user 112, such as the one or more relevant parties, may access the online platform 100 through a web based software application or browser. The web based software application may be embodied as, for example, but not be limited to, a website, a web application, a desktop application, and a mobile application compatible with a computing device 110.

Figure 2:
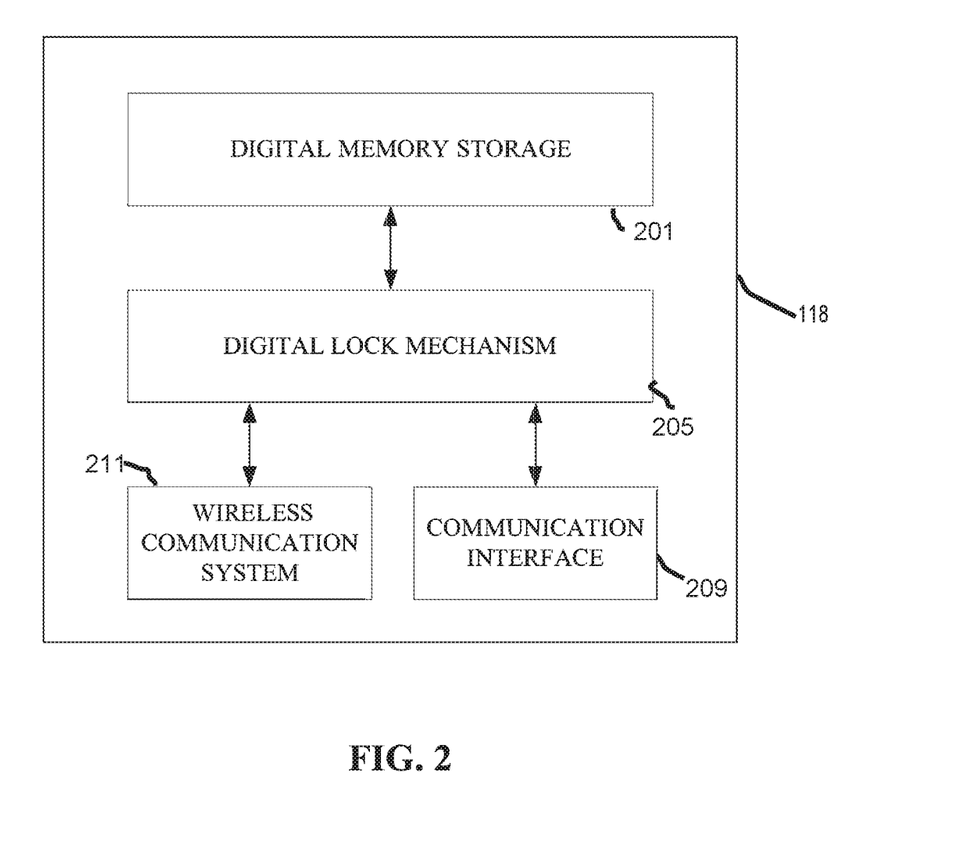
FIG. 2 is a block diagram of a portable storage device for facilitating data security, in accordance with some embodiments.

FIG. 2 is a block diagram representation of a portable storage device 118, in accordance with some embodiment. Accordingly, the portable storage device, in an instance, may be an electronic storage device configured to store digital data and provide security to the digital data using a digital lock mechanism. Further, the portable storage device, in an instance, may include components such as (but not limited to) a digital memory storage 201, a digital lock mechanism 205, a communication interface 209, and a wireless communication system 211, etc.

Further, the digital memory storage 201, in an instance, may be a digital data storing component of the portable storage device 118 which, in an instance, may be dedicated for storing digital data. Furthermore, the digital storage device, in an instance, may include implementation components as needed for devices such as (but not limited to) flash drive, Hard Disk Drive, and so on. Further, the digital lock mechanism may be used to provide safety and security to the stored digital data.

Further, the digital data, in an instance, may be any data in a digital form that the user may wish to protect from any unauthorized access. Further, the digital data may include, but is not limited to, one or more of audio content, video content, textual content, multimedia content, sensor data, and so on. For example, the digital data may include a confidential audio-visual recording of a presentation. In another instance, the digital data may include a confidential textual document.

Further, the digital lock mechanism, in an instance, may be governed by a set of algorithms or an embedded encryption and decryption processor. Furthermore, the set of algorithms provided within the portable storage device to govern the digital lock mechanism, in an instance, may encrypt and/or decrypt the digital data stored on the portable storage device. Further, the encryption and/or decryption processor, in an instance, may be a dedicated processor embedded within the portable storage device to encrypt and/or decrypt the digital data. Further, the communication interface provided within the portable storage device, in an instance, may allow the portable storage device to interface with a computer system. Further, the communication interface may include, but not limited to, USB (universal serial bus), Firewire®, Apple Lightning®, and so on. Further, the computer system, in an instance, may be an external computing device through which the digital data of the portable storage device may be accessed. The computer system, in an instance, may include devices such as (but not limited to) a personal computer, a desktop, a smartphone, a smartwatch, a tablet, and so on.

Further, the wireless communication system, in an instance, may include a short-range radio module configured to serve as a communication link between the portable storage device and a registered user device. Further, the wireless communication system, in an instance, may include one or more wireless radio standards such as (but not limited to) Bluetooth®, ZigBee®, WiFi, and so on.

Further, the wireless communication system, in an instance, may be configured to establish a communication link with the registered user device. Through the communication link, an encryption/decryption key may be transmitted from the registered user device to the portable storage device. Further, the encryption/decryption key, in an instance, may confirm an identity associated with the user. Further, in an instance, the encryption/decryption key may encrypt and/or decrypt the digital data stored on the portable storage device. Further, the registered user device, in an instance, may be any mobile device which may include a radio system similar to that in the wireless communication system. Further, the registered user device, in an instance, may be operated by an authorized user (such as an owner of the digital data). Therefore, the user's ownership of the digital data stored in the portable storage device may be confirmed. Further, the registered user device, in an instance, may be any wireless mobile device such as (but not limited to) mobile phone, pager, Walkie Talkie, etc.

Further, in some embodiments, the digital data stored in the portable storage device may be encrypted and may not be accessible to a computer system. Further, a wireless communication system, in an instance, may be embedded within the portable storage device. Further, the embedded wireless communication system may provide communication between the portable storage device and a registered user device. Further, the registered user device, in an instance, may transmit a decryption key to the embedded wireless communication system. Further, the transmitted decryption key, in some instance, may be used to decrypt the digital data. Further, decrypted digital data, in an instance, may be accessed by the computer system to which the portable storage device may be connected.

Further, the digital data on the portable storage device, in an instance, may remain decrypted as long as a connection may be established between the portable storage device and the registered user device. As a connection terminates, the digital data stored in the portable storage device may be encrypted. Further, in some embodiment, the digital data on the portable storage device may be encrypted when the portable storage device may be plugged out from the computer system.

Figure 3:
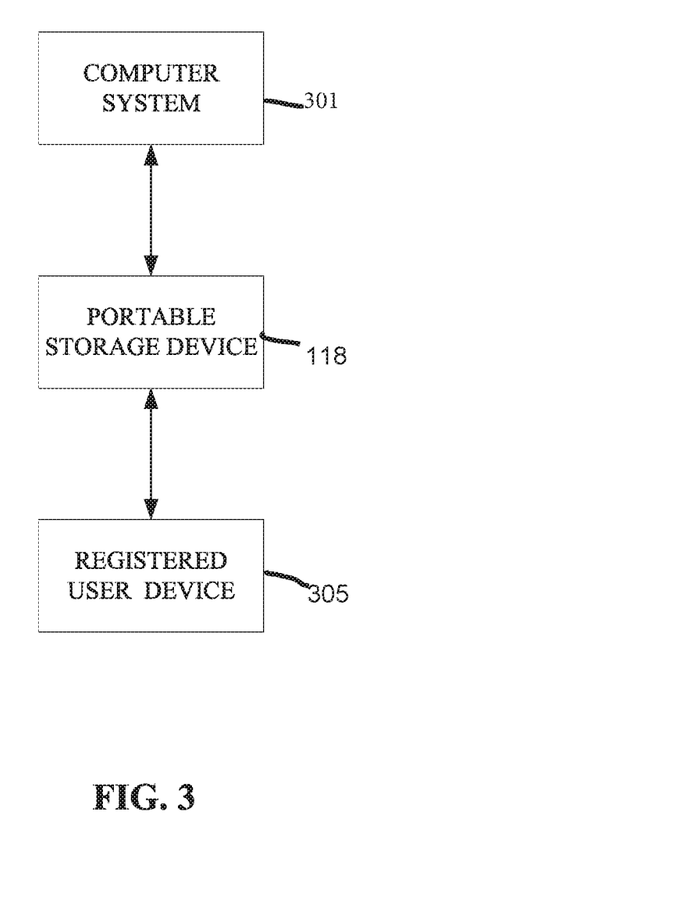
FIG. 3 is a block diagram representation of a system configured to facilitate data security in a portable storage device, in accordance with some embodiments.

FIG. 3 is a block diagram representation of a system configured to facilitate data security in a portable storage device, in accordance with some embodiments. The system, in an instance, may include a computer system, a registered user device and so on.

Further, the computer system 301, in an instance, may be an external computing device through which digital data of the portable storage device may be accessed. The computer system, in an instance, may include devices such as (but not limited to) a personal computer, a desktop, a smartphone, a smartwatch, a tablet, and so on. Further, the registered user device 305, in an instance, may be any mobile device including a radio system. Further, the registered user device 305, in an instance, may be operated by an authorized user (such as an owner of the digital content). Further, the registered user device, in an instance, may be any wireless mobile device such as (but not limited to) a mobile phone, a smartphone, a smartwatch, a laptop, a PC, a pager, a Walkie Talkie, and so on.

Further, the portable storage device 118, in an instance, may be an electronic data storage device. Further, the portable storage device may include components such as (but not limited to) a digital storage, the digital lock mechanism, a communication interface, and a wireless communication system, etc. as described with reference to FIG. 2.

Figure 4:
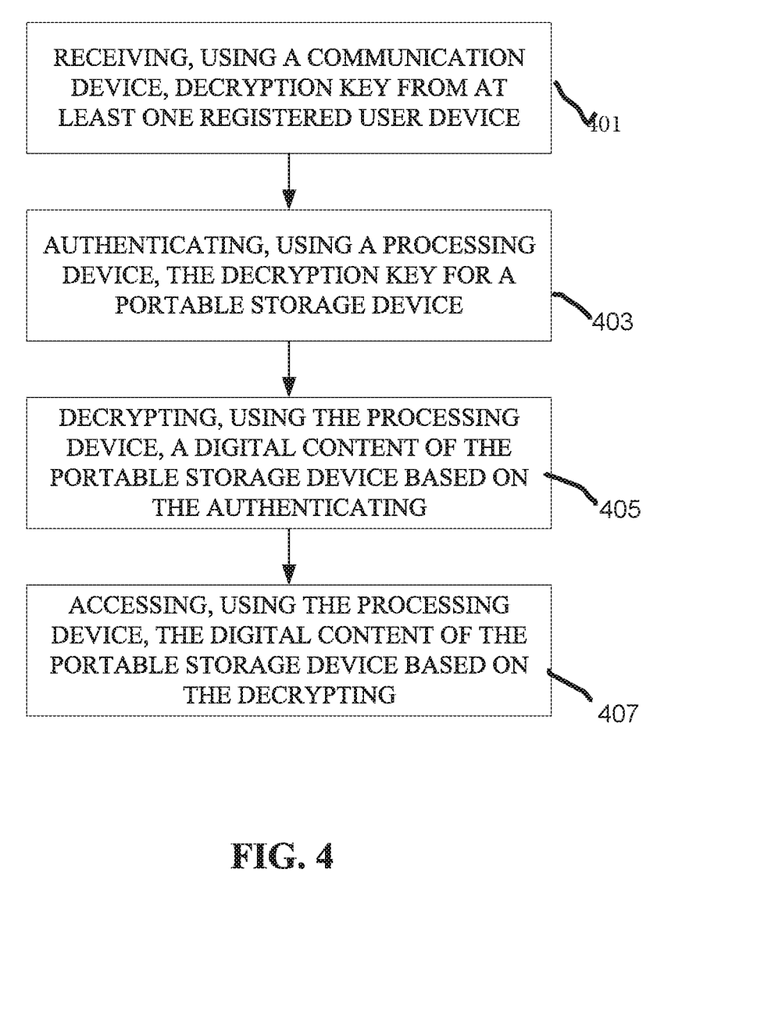
FIG. 4 is a flowchart of a method to facilitate data security in a portable storage device, in accordance with some embodiments.

FIG. 4 is a flowchart of a method to facilitate data security in a portable storage device, in accordance with some embodiments. Accordingly, the method may include a step of receiving 401, using a communication device, decryption key from at least one registered user device. The online platform 100, in an instance, may receive the decryption key. Further, the Portable Storage Device 118, in some instances, may receive the decryption key directly from registered user device. Further, the decryption key, may be passed over to the online platform through the registered user device. Further, the registered user device, in an instance, may be any mobile device which may include a wireless radio system configured to communicate with the online platform 100. Further, the registered user device, in an instance, may be operated by an authorized user (such as an owner of the digital data). Further, the registered user device, in an instance, may be any IoT based device such as (but not limited to) a mobile phone, a smartphone, a smartwatch, a laptop, a PC, a pager, a Walkie Talkie, and so on.

Further, the method may include a step of authenticating 403, using a processing device, the decryption key for a portable storage device. Further, the portable storage device, in an instance, may be an electronic data storage device. Further, the portable storage device may include components such as (but not limited to) a digital storage device, the digital lock mechanism, a communication interface, and a wireless communication system, etc. Furthermore, the digital storage device, in an instance, may include components such as (but not limited to) flash drive, hard disk drive, and so on.

Further, the method may include a step of decrypting 405, using the processing device within the portable storage device, a digital content of the portable storage device based on the authenticating. Further, the online platform 100 may decrypt the digital content stored on the portable storage device using the decryption key. Further, the digital content, in an instance, may be any content in a digital form that the user may wish to protect from unauthorized access. Further, the digital content may include, but is not limited to, one or more of audio content, video content, textual content, multimedia content and sensor data. For example, the digital content may include a confidential audio-visual recording of a presentation. In another instance, the digital content may include a confidential textual document.

Further, the method may include a step of accessing 407, using the processing device, the digital content of the portable storage device based on the decrypting. The online platform 100 may access the digital content stored in the portable storage device after decrypting the digital content stored in the portable storage device.

Figure 5:
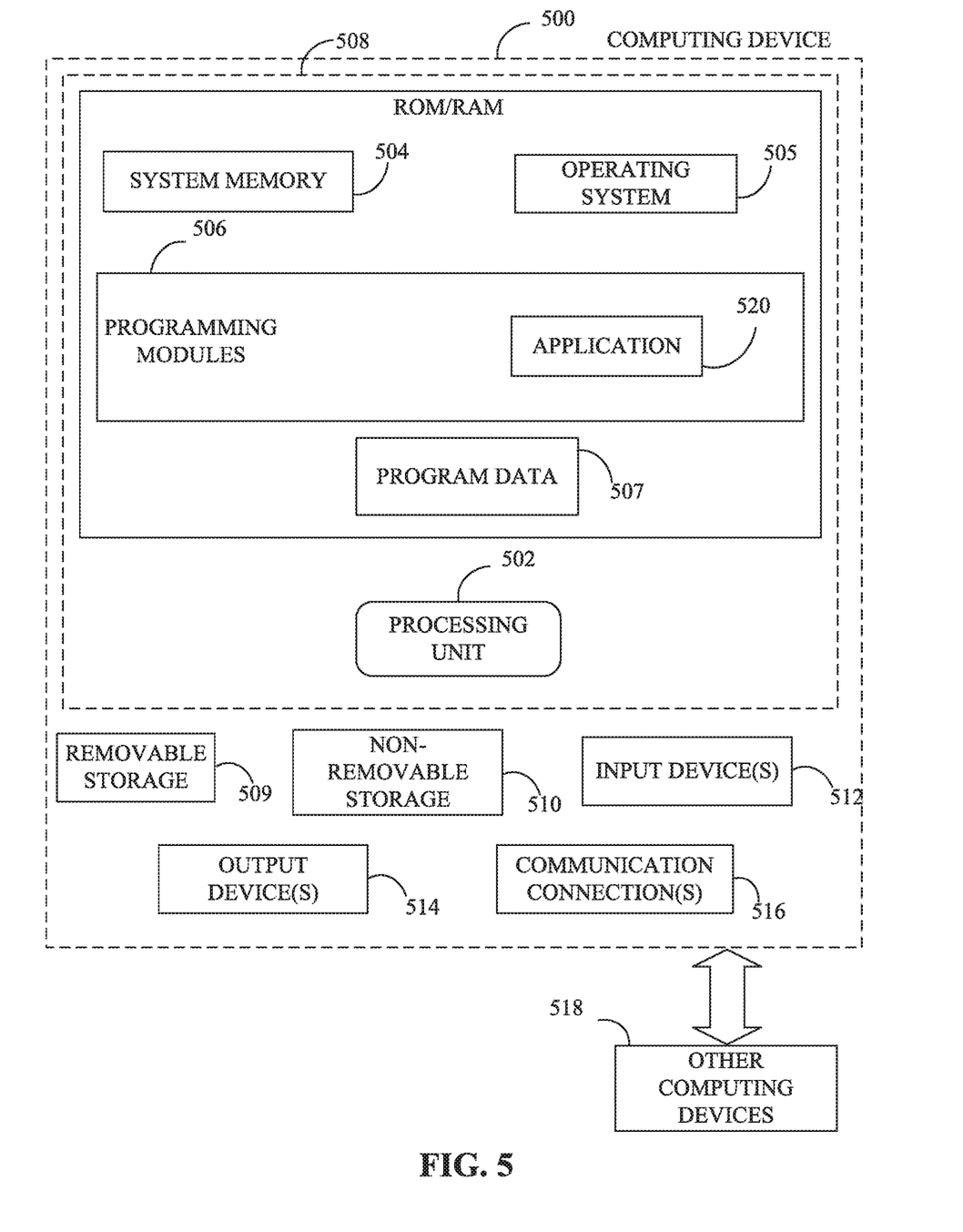
FIG. 5 is a block diagram of a computing device for implementing the methods disclosed herein, in accordance with some embodiments.

With reference to FIG. 5, a system consistent with an embodiment of the disclosure may include a computing device or cloud service, such as computing device 500. In a basic configuration, computing device 500 may include at least one processing unit 502 and a system memory 504. Depending on the configuration and type of computing device, system memory 504 may comprise, but is not limited to, volatile (e.g. random-access memory (RAM)), non-volatile (e.g. read-only memory (ROM)), flash memory, or any combination. System memory 504 may include operating system 505, one or more programming modules 506, and may include a program data 507. Operating system 505, for example, may be suitable for controlling computing device 500's operation. In one embodiment, programming modules 506 may include image-processing module, machine learning module and/or image classifying module. Furthermore, embodiments of the disclosure may be practiced in conjunction with a graphics library, other operating systems, or any other application program and is not limited to any particular application or system. This basic configuration is illustrated in FIG. 5 by those components within a dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage 509 and a non-removable storage 510. Computer storage media may include volatile and nonvolatile, removable and non-removable media implemented in any method or technology for storage of information, such as computer-readable instructions, data structures, program modules, or other data. System memory 504, removable storage 509, and non-removable storage 510 are all computer storage media examples (i.e., memory storage.) Computer storage media may include, but is not limited to, RAM, ROM, electrically erasable read-only memory (EEPROM), flash memory or other memory technology, CD-ROM, digital versatile discs (DVD) or other optical storage, magnetic cassettes, magnetic tape, magnetic disk storage or other magnetic storage devices, or any other medium which can be used to store information and which can be accessed by computing device 500. Any such computer storage media may be part of device 500. Computing device 500 may also have input device(s) 512 such as a keyboard, a mouse, a pen, a sound input device, a touch input device, a location sensor, a camera, a biometric sensor, etc. Output device(s) 514 such as a display, speakers, a printer, etc. may also be included. The aforementioned devices are examples and others may be used.

Computing device 500 may also contain a communication connection 516 that may allow device 500 to communicate with other computing devices 518, such as over a network in a distributed computing environment, for example, an intranet or the Internet. Communication connection 516 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 504, including operating system 505. While executing on processing unit 502, programming modules 506 (e.g., application 520 such as a media player) may perform processes including, for example, one or more stages of methods, algorithms, systems, applications, servers, databases as described above. The aforementioned process is an example, and processing unit 502 may perform other processes. Other programming modules that may be used in accordance with embodiments of the present disclosure may include sound encoding/ decoding applications, machine learning application, acoustic classifiers etc.

In an embodiment in which the portable storage device is a USB device with Bluetooth®, the implementation may include a button, which may be hidden, within the portable storage device. For initial set-up, power is supplied to the portable storage device and the button is depressed so that a linking signal is generated which is detected by a user's smart phone or equivalent Bluetooth® enabled device which creates a pairing between the two devices as is well known in the art.

Once the initial pairing set up has been completed, the two devices will remain paired so long as within Bluetooth® range of each other. The Bluetooth® range is dependent on many factors but is considered to be a relatively short distance, for example measured in feet rather than miles. Of course, since the portable storage device obtains its power from being plugged into a port, such as a USB port of a desktop or laptop computer, and is accessed by a user while using such computer, data which is stored on the portable storage device can be retrieved by the computer. However, once the user moves away from the computer and is no longer within Bluetooth® range, the portable storage device is disabled and data stored on the portable storage device can no longer be accessed by the computer even though the portable storage devices still plugged into a port on the computer.

Figure 6:
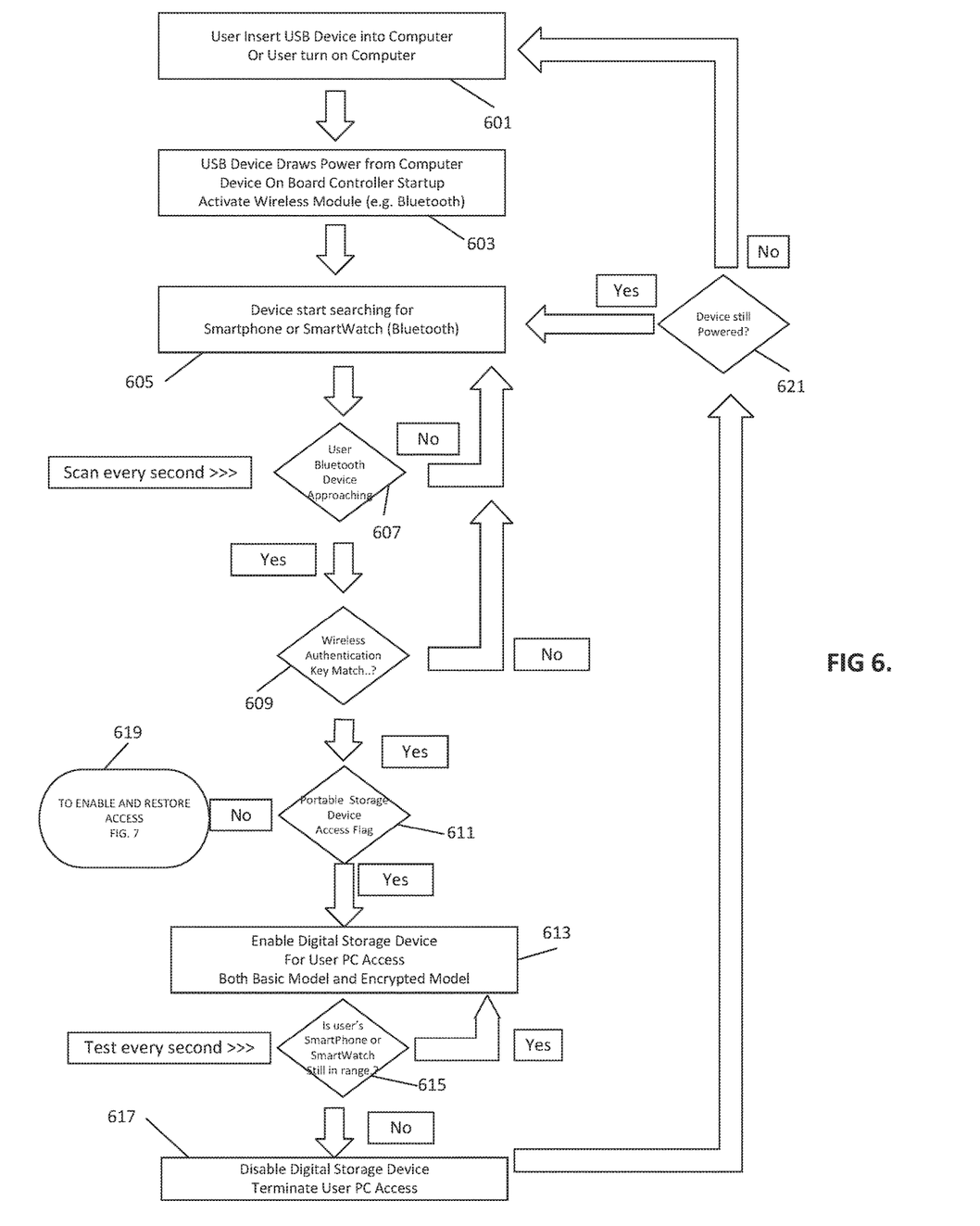
FIG. 6 is a detailed flowchart of a method to facilitate data security in a portable storage device, in accordance with some embodiments.

FIG. 6 shows the process flow for pairing and authenticating a USB storage device and user's phone or other Bluetooth® enabled device.

At step 601, a USB storage device is inserted into a USB port of a computer. At step 603, power is supplied to the USB storage device from the computer which activates the wireless module on the USB storage device, which in an embodiment is a Bluetooth® module. At step 605, the Bluetooth® module includes a search mechanism which at step 607 looks for a Bluetooth® enabled device which, if successful at step 609 results in a hand shaking protocol so that the two devices become wirelessly paired. However, since many USB protocols will always connect to a new device during pairing mode, in an embodiment, to prevent unauthorized access, at step 611, an optional further check is made to determine if the USB storage device was previously paired to the same Bluetooth® enabled device. If so, the USB storage device is unlocked at step 613 so that the computer that it is plugged into can access data on the USB storage device once such access has been enabled at step 613. Otherwise, the connection fails and at step 619, the device must be repaired as detailed with reference to FIG. 7. In an embodiment without step 611, at step 613, the personal storage device is directly enabled for access by the computer after authentication step 609.

If the no Bluetooth device is detected at step 607 or wireless authentication fails at step 609, the process repeats so long as the USB storage device is powered. The attempt to detect the user's Bluetooth® enabled device at step 607 is based on a scan every second or so and for a length of time as defined by the Bluetooth® standard being employed. However, even if a Bluetooth® enabled device is detected at step 607, it must be a device which has been previously authenticated as determined by step 609.

Once the USB storage device has been enabled at step 613, a scan similar to the scan performed at step 607 is performed at step 615 to ensure that the USB enabled device is still within Bluetooth® range. If not, at step 617, the USB storage device is disabled so that data stored on the USB storage device can no longer be accessed by the computer even though still connected via the USB port.

After step 617, a further test is made at step 621 to determine if the USB enabled device is still powered in which case the process beginning at step 605 is repeated. Otherwise, the USB device will no longer be active until such time as it is plugged into a USB port and power is applied.

In most cases, a simple disabling of the USB storage device is sufficient. However, a person with suitable skills and equipment can possibly access data stored on the USB storage device. Accordingly, in an embodiment, a suitable piece of software running on the user's Bluetooth® enabled device can be employed to encrypt the data on the portable storage device so that in addition to the requirement that there be an authentication key match at step 609, step 609 can also include an encryption key match to decrypt the stored data. Such decryption can take place as the data is being transferred to the computer, or the key can be passed with the data so that such decryption takes place on the computer.

Thus, the invention can be implemented with or without encryption. With encryption, an encryption processor is also present. Without encryption, the device will unlock the storage unit and therefore its content becomes fully accessible when proper authentication of ownership is established during the wireless exchange as explained above using Bluetooth® devices.

A USB storage device with or without content encryption is not active until the owner's smartphone or smartwatch is within proximity and the wireless connection is established. That is inserting the USB device into a computer will not activate it. It will act like nothing is inserted or it is broken.

A USB storage device with content encryption requires a second authentication to obtain the decryption key. Thus, with content encryption, even though the content may be accessed after Bluetooth® pairing is complete, the content is encrypted and cannot be read until the second authentication is completed. Since encryption and decryption techniques are well known in the art, further details are not set forth herein.

In an embodiment in which the personal storage device includes Bluetooth® and a WiFi radio, the Bluetooth® is used to confirm ownership and proximity of the user. The WiFi radio may be used to enable geo-fencing of the device. That is, the owner must be in close proximity and the device must be within (for example) the WiFi coverage of the owner's office or home WiFi network. Such geo-fencing is set up with an app running on a user's mobile device as is well known in the art.

Although the portable storage device can be unlocked using Bluetooth® pairing as explained above with reference to FIG. 6, typical Bluetooth® pairing does not differentiate between an initial pairing versus an existing pairing, other than with an existing pairing, the user does not need to select the Bluetooth® device being paired in most cases. Although this provides a convenience to the user, if the device is lost or stolen, a third party would be able to pair the portable storage device with the third party's Bluetooth® enabled device.

Figure 7:
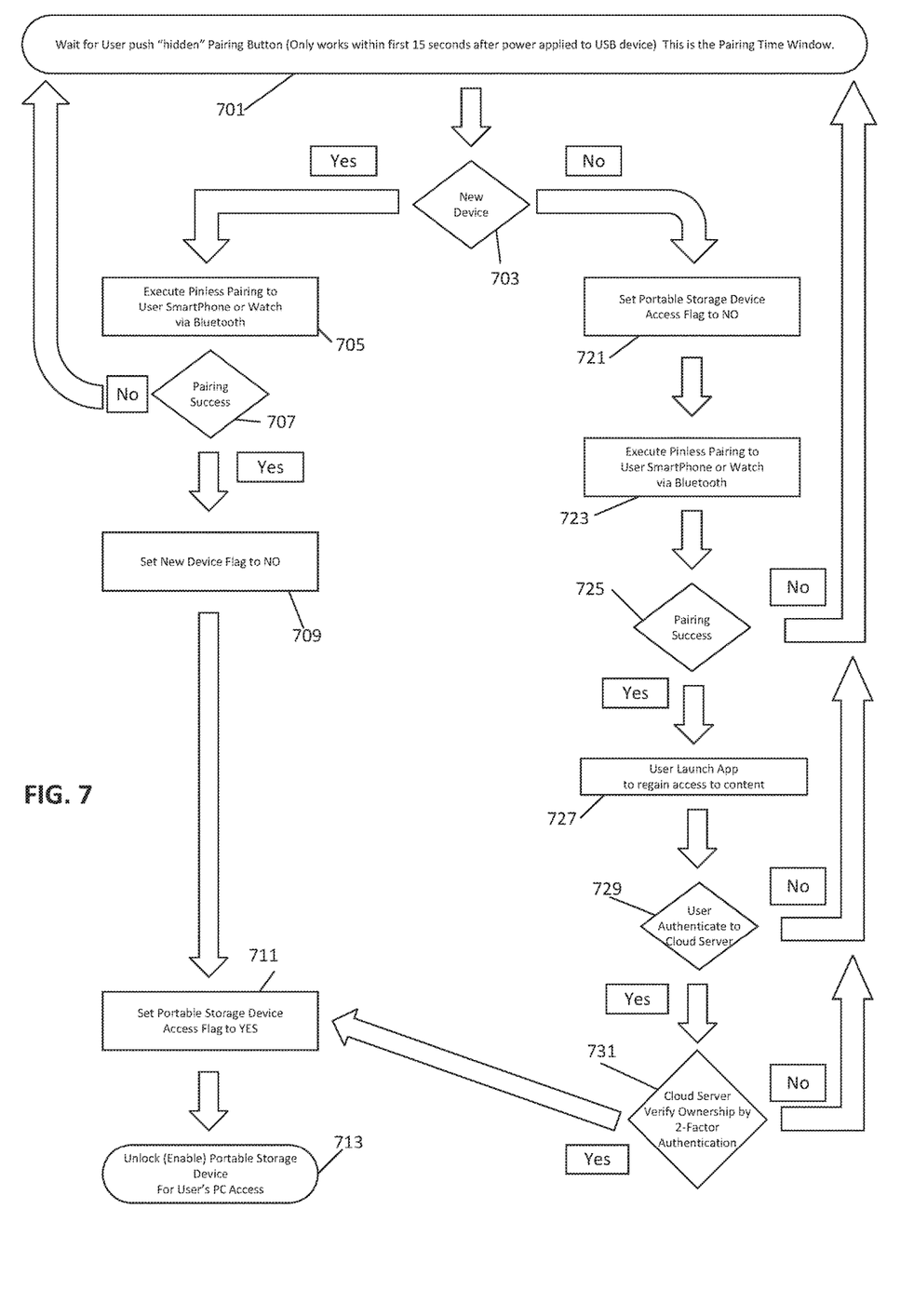
FIG. 7 is a detailed flowchart of a method to initially pair two devices, in accordance with some embodiments.

FIG. 7 outlines a procedure for preventing unauthorized access to the portable storage device. After power has been supplied, for example by the user inserting the USB portable storage device into a USB port of a computer as shown for example at step 601 of FIG. 6, during a pairing time window, typically about 15 seconds after power has been applied, at step 701, if a user presses a pairing button on the portable storage device within the pairing timing window, which button may be hidden, or otherwise in a location from which it cannot be accidentally pressed, a new device test is made at step 703 to determine if a "new device" flag has been set, that is, to YES, TRUE or logic 1. The new device flag is set during device manufacture, before an initial use. If the test at step 703 determines that the new device flag is set, then an attempt to pair the portable storage device to the user's Bluetooth® enabled device is performed at step 705. If successful at step 707, the new device flag is reset to NO, FALSE or logic 0 at step 709. Then at step 711, a device access flag is set to YES, TRUE or logic 1 and the device is unlocked at step 713 so that its stored content can be accessed by the computer device to which the portable storage device is connected. Although not shown in FIG. 7, after step 713, the process continues with steps 613, 615 and 617 shown in FIG. 6. In this manner, the data on the portable storage device is accessible by the computer so long as Bluetooth® enabled device is within range as described above.

At step 703, if the new device test fails, then the portable storage device access flag is set to NO or FALSE or logic 0 at step 721. Then, in a manner similar to steps 705 and 707, the portable storage device and Bluetooth® enabled smart phone or similar device are paired at steps 723 and 725. If the pairing attempt is not successful, then the user must begin the process again by pressing the pairing button at step 701.

If step 725 results in a successful pairing, then an app running on the user's Bluetooth® enabled device is used to regain access to the content on the portable storage device at step 727. In an embodiment, the user is required to authenticate to a cloud server at step 729. In an embodiment, the cloud server verifies ownership by 2—factor authentication at step 731. In this manner, if the portable storage device was lost or stolen, then a third party seeking to gain access to the device will be unable to do so since such third party would not have the necessary credentials to authenticate to the cloud server. The specifics regarding such cloud server and 2-factor authentication are well known in the art and, therefore, need not be further explained herein. If the test at step 729 or step 731 fail, then the user must again seek to pair the device by pressing the pairing button at step 701. The ownership verification at step 731 can be any verification technique such as a simple password without 2-factor authentication. Such authentication can be built into an app running on the Bluetooth® enabled device which does not need cloud access.

If the test at steps 729 and 731 are successful, then the portable storage device access flag is set to YES, TRUE or logic 1, and the portable storage device is unlocked at step 713 for access by the computer into which the USB storage device is connected.

The initial authentication can be performed at any time, but in an embodiment, after an initial pairing with a specific Bluetooth® enabled device has been completed, since the new device flag will be set to NO, any subsequent attempt to pair to a different Bluetooth® enabled device will fail unless the ownership is verified at step 731.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general purpose graphics processor-based systems, multiprocessor systems, microprocessor-based or programmable consumer electronics, application specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure. Although the invention has been explained in relation to its preferred embodiment, it is to be understood that many other possible modifications and variations can be made without departing from the spirit and scope of the invention.

I claim:

1. A portable storage device for connecting to a computer comprising:
    a) a digital memory storage;
    b) a digital lock mechanism coupled to said digital memory storage;
    c) a wireless communication system coupled to said digital lock mechanism;
    d a communication interface coupled to said digital lock mechanism;
    wherein said communication interface is for connecting said portable storage device to said computer, and said digital lock mechanism operates to prevent data in said digital memory storage from being transferred over said communication interface to said computer unless said digital lock mechanism is unlocked using said wireless communication system,
    wherein said wireless communication system uses a Bluetooth® connection protocol,
    wherein said digital lock mechanism comprises after said portable storage device is paired with said companion Bluetooth® enabled device, setting a portable storage device access flag to enable said computer to access said portable storage device,
    wherein said locking mechanism includes a new device flag which is initialized to indicate that said portable storage device has not been previously accessed,
    wherein after said portable storage device is paired with a companion Bluetooth® enabled device, prior to setting said portable storage device access flag to enable said computer to access said portable storage device, said digital lock mechanism checks when said new device flag indicates that said portable storage device has not been previously accessed, said digital lock mechanism updates said new device flag to indicate that said portable storage device has been previously accessed and sets said portable storage device access flag to enable said computer to access said portable storage device,
    wherein after said portable storage device is paired with said companion Bluetooth® enabled device, prior to setting said portable storage device access flag to enable said computer to access said portable storage device, said digital lock mechanism checks when said new device flag indicates that said portable storage device has been previously accessed, enables said computer to access said portable storage device.

2. The portable storage device defined by claim 1 wherein said digital lock mechanism is unlocked after said portable storage device is paired with a companion Bluetooth® enabled device, and said digital lock mechanism is locked when said portable storage device is not paired with a companion Bluetooth® enabled device.

3. The portable storage device defined by claim 2 further comprising periodically testing to confirm that said companion Bluetooth® enabled device is within a predetermined range of said portable storage device.

4. The portable storage device defined by claim 1 wherein said digital memory storage is one of RAM, ROM, electrically erasable read-only memory (EEPROM), flash memory, CD-ROM, hard disk drive and digital versatile discs (DVD).

5. The portable storage device defined by claim 1 wherein said communication interface is one of USB (universal serial bus), Firewire®, and Apple Lightning®.

6. A method for connecting a portable storage device to a computer comprising:
    a) inserting the portable storage device into a powered port of the computer;
    b) initiating a pairing connection attempt with a Bluetooth® enabled device;
    c) searching for a Bluetooth® enabled device;
    d) detecting a Bluetooth® enabled device within a predetermined range of said portable storage device;
    e) authenticating the detected Bluetooth® enabled device by checking for an authentication key match indicating a prior successful pairing of said detected Bluetooth® enabled device and said portable storage device;
    f) after said authentication key match is obtained, enabling said portable storage device to be accessed by said computer;
    g) after said enabling, periodically checking to confirm that said portable storage device and said detected Bluetooth® enabled device are within said predetermined range of each other;
    h) after said periodic checking, when said portable storage device and said detected Bluetooth® enabled device are within said predetermined range of each other, enabling said portable storage device to be accessed by said computer; otherwise, disabling said portable storage device access by said computer;
    after said authenticating, checking a portable storage access flag indicating a prior pairing of said portable storage access device and said detected Bluetooth® enabled device;
    after said portable storage access flag checking, when said portable storage access flag indicates said prior pairing, enabling said portable storage device to be accessed by said computer.

7. The method for connecting a portable storage device to a computer defined by claim 6 further comprising:
    after said portable storage access flag checking, when said portable storage access flag does not indicate said prior pairing, causing said portable storage device access to said computer to be repaired before enabling said access.

8. A method for connecting a portable storage device to a computer comprising:

a) inserting the portable storage device into a powered port of the computer and initiating a pairing with a Bluetooth® enabled device by pressing a button on the portable storage device within a predetermined pairing time window;
b) checking said portable storage device for a new device flag;
c) when said checking determines said new device flag is a logic YES, attempt to pair said Bluetooth® enabled device and said portable storage device within said predetermined pairing time window;
d) when said Bluetooth® enabled device and said portable storage device are paired after said checking, setting the new device flag to a logic NO and setting a portable storage device access flag to a logic YES;
e) when said portable storage device access flag is a logic YES, enabling said portable storage device to be accessed by said computer.

9. A method for connecting a portable storage device to a computer comprising:
a) inserting the portable storage device into a powered port of the computer and initiating a pairing with a Bluetooth® enabled device by pressing a button on the portable storage device within a predetermined pairing time window;
b) checking said portable storage device for a new device flag;
c) when said checking determines said new device flag is a logic NO, setting a portable storage device access flag to a logic NO, and attempt to pair said Bluetooth® enabled device and said portable storage device within said predetermined pairing time window;
d) when said Bluetooth® enabled device and said portable storage device are paired after said attempt, launching an app on said Bluetooth® enabled device for authenticating said Bluetooth® enabled device;
e) when said Bluetooth® enabled device is authenticated after said launching, setting said portable storage device access flag to a logic YES;
f) when said portable storage device access flag is a logic YES, enabling said portable storage device to be accessed by said computer.

* * * * *